United States Patent
Ma et al.

(10) Patent No.: US 8,046,323 B2
(45) Date of Patent: Oct. 25, 2011

(54) CONTEXT BASED BOOKMARK

(75) Inventors: Yue Ma, Beijing (CN); Bo Min Nie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/945,620

(22) Filed: Nov. 27, 2007

(65) Prior Publication Data
US 2009/0006304 A1    Jan. 1, 2009

(30) Foreign Application Priority Data

Nov. 27, 2006  (CN) .......................... 2006 1 0163022

(51) Int. Cl.
*G06F 9/44* (2006.01)
*G06N 7/02* (2006.01)
*G06N 7/06* (2006.01)
*G06F 17/30* (2006.01)
(52) U.S. Cl. ........................... 706/52; 707/741; 715/241
(58) Field of Classification Search ...................... 706/52
See application file for complete search history.

(56) References Cited

U.S. PATENT DOCUMENTS

| | | | |
|---|---|---|---|
| 5,619,709 A * | 4/1997 | Caid et al. ..................... | 715/209 |
| 5,659,729 A | 8/1997 | Nielsen | |
| 6,219,679 B1 * | 4/2001 | Brisebois et al. ............. | 715/206 |
| 7,149,982 B1 * | 12/2006 | Duperrouzel et al. ........ | 715/788 |
| 7,603,349 B1 * | 10/2009 | Kraft et al. ............................ | 1/1 |
| 7,783,979 B1 * | 8/2010 | Leblang et al. ............... | 715/739 |
| 2008/0172364 A1 * | 7/2008 | Cucerzan et al. .................. | 707/3 |
| 2010/0250530 A1 * | 9/2010 | Wang et al. .................... | 707/732 |

* cited by examiner

*Primary Examiner* — Jeffrey A Gaffin
*Assistant Examiner* — Stanley K Hill
(74) *Attorney, Agent, or Firm* — Kunzler Needham Massey & Thorpe

(57) ABSTRACT

The present invention relates to a method and an apparatus for setting a bookmark for a resource accessed by a user, and for using the bookmark. The bookmarking method includes: collecting screen context information for the real text in the current screen of the resource in response to a request to bookmark the current screen of the resource; and storing address information and the screen context information of said resource as a bookmark to be used to return to said specific section of the resource. The method of providing a specific section of a resource based on a preset bookmark can include: downloading the resource content identified by said address information to a memory in response to a user's request to reopen the resource; collecting screen context information for the downloaded resource content; comparing the screen context information of the downloaded resource content with the screen context information indicated by said bookmark, selecting the specific section of the downloaded resource according to the rule of fuzz matching, and displaying the selected specific section of the resource in the display window.

20 Claims, 5 Drawing Sheets

CONTEXT BASED BOOKMARK

BACKGROUND OF THE INVENTION

The present invention relates to a method and an apparatus for setting a bookmark for a resource accessed by a user, and for using the bookmark.

The World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse. Thus, a link can be a very useful Internet navigational tool. Note that Web page and document will henceforth be used interchangeably.

Another useful Internet navigational tool is a bookmark. A bookmark is available in most Web browsers. A Web browser is a software application that is used to locate Web sites and display Web pages. In the Web browser, the bookmark allows a user to store Web addresses or URLs (Uniform Resource locators) of Web pages into a folder, for example, a bookmark folder, so as to designate the protocol such as HTTP or FTP and the positions of objects, documents, Web pages or other targets in the Internet or Intranet, which will be helpful for later re-visiting.

When a user accesses a Web page that may later be re-visited, the user may bookmark the Web page. But, when the Web page is re-visited subsequently, the Web page is always displayed from its beginning. If the user wanted to return to a passage that is in the middle or near the end of the page, the user has to scroll down the page looking for the passage. This can be a non-trivial endeavor, especially if the document being revisited is a large one.

Therefore, what is needed is a bookmark having a function of displaying a specific section of the accessed object. In the prior art, a function of setting a bookmark utilizing the cursor position is provided for editable documents like Office documents. Specifically, when locating the bookmark, the editor needs to move the cursor to a position in the editable document where a bookmark is desired to be set, so as to perform bookmarking. Thereby, when the bookmark is referenced by UNC (Universal Naming Conversion) path in another editable document, a specific section of bookmarked document can be displayed.

However, the setting of the bookmark capable of directing to a specific section of an object depends on the cursor position, and the bookmark systems always require indicating the cursor position where the bookmark is located. For an editable document, this is natural, but this is impossible for a web page and an un-editable document like read-only PDF. Today, with the spread of e-books and soft materials provided by web sites, a new bookmark solution to bookmark these un-editable documents is desired.

Various solutions for web pages have been proposed. For example, US2004/0205543A1 discloses that, when the users are allowed to bookmark a Web page, the user may store, in conjunction with the URL of the page, the size of the window within which the page is displayed, the location of both the horizontal and vertical scroll boxes in the window and the font attributes used to display the page. This allows only the specific section of the page to be displayed when the bookmarked Web page is re-visited. U.S. Pat. No. 6,219,679 B1 teaches a solution which uses the coordinate pair of the top left corner and the bottom right corner of the display area as a part of the bookmark locator to define the section of the page displayed while being re-visited.

BRIEF SUMMARY OF THE INVENTION

The present invention addresses the defects in setting bookmarks with cursors, coordinates and so on in the prior art, and proposes a technical solution which can bookmark not only an un-editable document but also an editable document.

According to one aspect of the present invention, a method of bookmarking a specific section of a resource in a data processing system is provided, the method including collecting screen context information for the real text in the current screen of the resource in response to a request to bookmark the current screen of the resource; and storing address information and the screen context information of the resource as a bookmark to be used to return to the specific section of the resource.

The present invention proposes to reflect the content and the structure of the document in the display screen by collecting screen context information and taking the screen context information as a part of the bookmark. Thus, when the bookmarked resource content is re-visited, it can be compared with the re-visited resource content by using the recorded screen context information, so as to select the specific section of the downloaded resource. The screen context information may be collected for the current screen of the resource at a certain collection rate input by the user or obtained from a storage unit.

The screen context information may include a text locator element. For example, the text locator element may be the first word, a certain word or the first paragraph in the current screen. The screen context information may further include text locating auxiliary information for assisting the text locator element to locate the document. For example, the text locating auxiliary information may be at least one of line number, paragraph number, screen resolution and/or the way how the text is arranged and displayed.

The method of bookmarking a resource according to the present invention further may include making abstract information for the real text of the resource and storing the abstract information as a part of the bookmark. Making an abstract for the current screen may include making an abstract for the current screen at a predetermined collection rate.

According to another aspect of the present invention, a method of providing a specific section of a resource based on a preset bookmark is provided, the bookmark including address information and screen context information obtained by collecting the specific section of the resource. The method may include downloading the resource content identified by the address information to a memory in response to a user's request to reopen the resource; collecting screen context information for the downloaded resource content; and comparing the screen context information of the downloaded resource content with the screen context information indicated by the bookmark, selecting the specific section of the downloaded resource according to the rule of fuzzy matching, and displaying the selected specific section of the resource in the display window.

Similarly, screen context information for the downloaded resource content may be collected at the same predetermined collection rate.

In addition, the screen context information of the bookmark may include a text locator element. Accordingly, collecting screen context information for the downloaded resource content at the predetermined collection rate may include: retrieving the section in the downloaded resource content which matches with the text locator element; and collecting the real text for the downloaded resource content at the predetermined collection rate based on the section which matches with the text locator element, so as to obtain respective simulated screen snapshots to be compared with the screen context information of the bookmark.

The bookmark further may include abstract information made for the real text of the resource. Accordingly, after downloading resource content, the method of providing a specific section of a resource based on a preset bookmark further may include: making abstract information for the downloaded resource content, and comparing this abstract information with the abstract information indicated by the bookmark, and judging whether the downloaded resource content is effective.

The present invention further may provide a bookmarking apparatus for bookmarking a specific section of a resource in a data processing system, including: a collection unit for collecting screen context information for the real text in the current screen of the resource in response to a request to bookmark the current screen of the resource; and a storage unit for storing address information and the screen context information of the resource as a bookmark to be used to return to the specific section of the resource.

In addition, the present invention further may provide an apparatus for providing a specific section of a resource based on a preset bookmark, the bookmark including address information and screen context information obtained by collecting the specific section of the resource, the apparatus including: a compare unit for downloading the resource content identified by the address information to a memory in response to a user's request to reopen the resource, collecting screen context information for the downloaded resource content, and comparing the screen context information of the downloaded resource content with the screen context information indicated by the bookmark; a locator for selecting the specific section of the downloaded resource according to the rule of fuzzy matching, and displaying the selected specific section of the resource in the display window.

The present invention can make use of the screen context information to memorize the reading or editing position in the document; thus the document can be bookmarked without the help of the locatable information such as cursors and coordinates. When it is re-visited, the recorded screen context information and the re-visited resource content are compared using a fuzzy matching method, so as to accurately locate the reading or editing position in the document.

The present invention may adopt the screen context information reflecting the content and the structure of the document. In contrast to U.S. Pat. No. 6,219,679B1 et al., which located the specific display area with the coordinates of the top left corner and the bottom right corner, the present invention can accurately locate the specific position in the document without being influenced by the actual arrangement manner of the document or the change of information.

In addition, the present invention may make abstract information for the resource content. Thus, when the document is revisited, the document's effectiveness is checked by comparing the recorded abstract information with the abstract information made while re-visiting.

With the bookmarking method according to the present invention, we can switch to various files, positions in the files or web pages in the world wide web, or web pages over Intranet through URL address or UNC path. Also, file locating can be performed among different document types on the same computer by using similar UNC (Universal Naming Conversion) paths. For example, file locating can be performed mutually among Microsoft® Office® documents such as Microsoft Word, Microsoft Excel®, Microsoft PowerPoint®, and Microsoft Access™, among Adobe®Acrobat® documents, and between Microsoft Office and Adobe Acrobat documents.

The other features of the present invention will be apparent from the following description of the illustrative embodiments with reference to the drawings.

DETAILED DESCRIPTION OF THE INVENTION

Hereinafter, embodiments of the present invention will be described in detail with reference to the drawings. However, the present invention can be implemented in various ways, and those skilled in the art can easily understand that the manner and the details of the present invention can be changed into various manners without departing from the spirit and scope of the present invention. Thus, the present invention should not be construed as being limited by the contents described in the embodiments.

Some terminologies used in the description are introduced as follows:

Screen Context information: Screen Context records the information of the current screen, including at least one of the first word in the screen, the screen resolution, the first paragraph, and the line number. Screen Context information could be different for different documents; for example, it could have "heading" information for an html document.

Collection Rate is the rate utilized to collect the document content. For example, if the collection rate is 100%, then the whole document is recorded.

Re-display mode: Re-display mode tells the bookmarking apparatus how to re-locate the document position bookmarked. For instance, if the re-display mode is "locate by first word", then the first word recorded in the screen context is placed as the first word in the screen when relocating.

Effective Document: A document is an effective document only when the bookmarking apparatus identifies that it is still the same document since the last time it was bookmarked.

Figure 1:
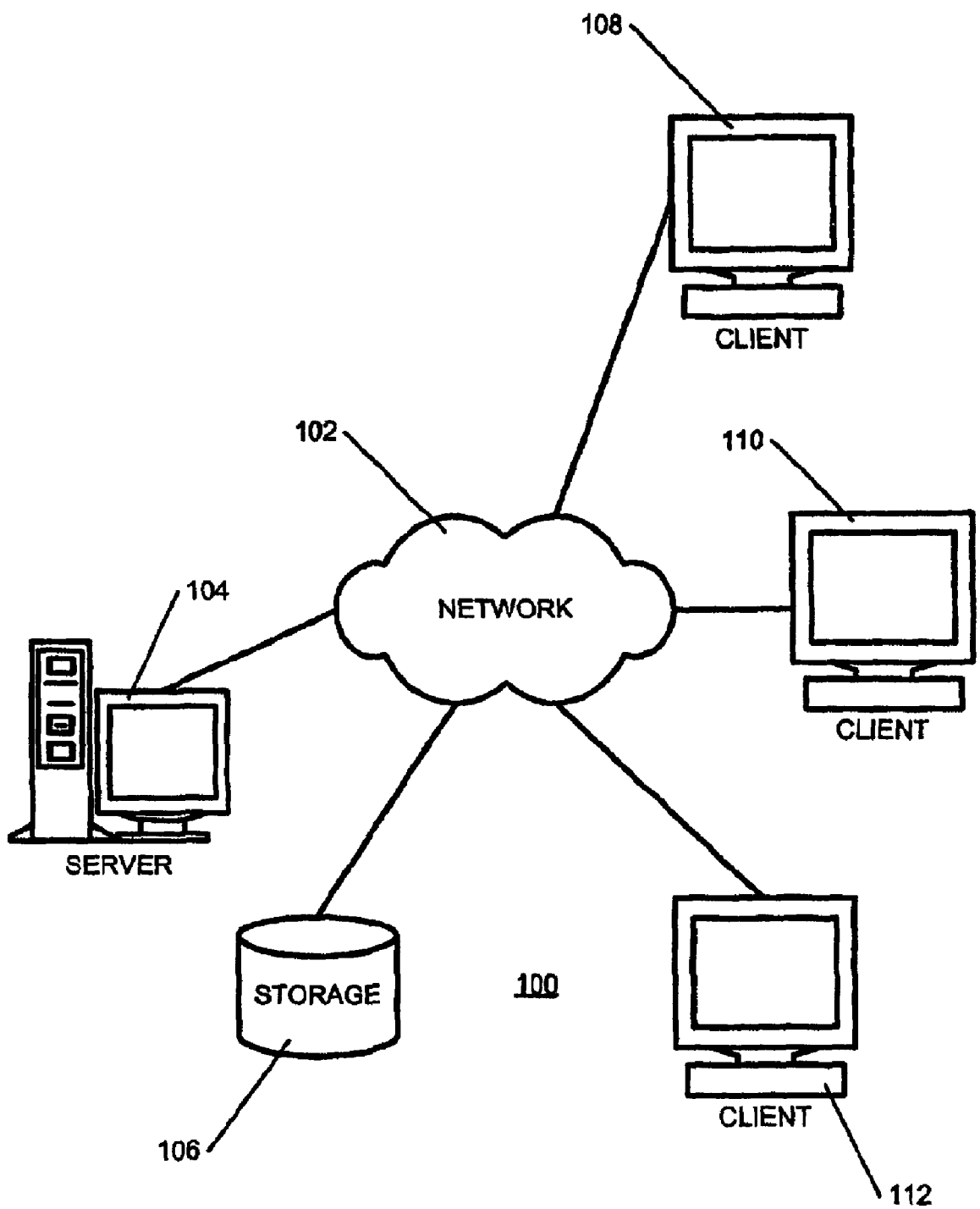
FIG. 1 shows an exemplary block diagram illustrating a distributed data processing system according to the present invention.

With reference now to the figures, FIG. 1 depicts a pictorial representation of the present invention. Data processing system 100 is a network of computers in which the present invention may be implemented. Data processing system 100 includes a network 102, which is the medium used to provide communications links between various devices and computers connected together. Network 102 may include connections, such as wire, wireless communication links, or fiber optic cables.

In the depicted example, server 104 and storage unit 106 are connected to network 102. In addition, clients 108, 110, and 112 of server 104 may be personal computers or network computers. In the depicted example, server 104 provides data, such as boot files, operating system images, and applications to clients 108, 110 and 112. In the network data processing system 100, network 102 represents a worldwide collection of networks and gateways that use the TCP/IP suite of protocols to communicate with one another. At the heart of the Internet is a backbone of high-speed data communication lines between major nodes or host computers consisting of thousands of commercial, government, educational and other computer systems that route data information. Of course, network data processing system 100 also may be implemented in an intranet, a local area network (LAN), or a wide area network (WAN).

Figure 2:
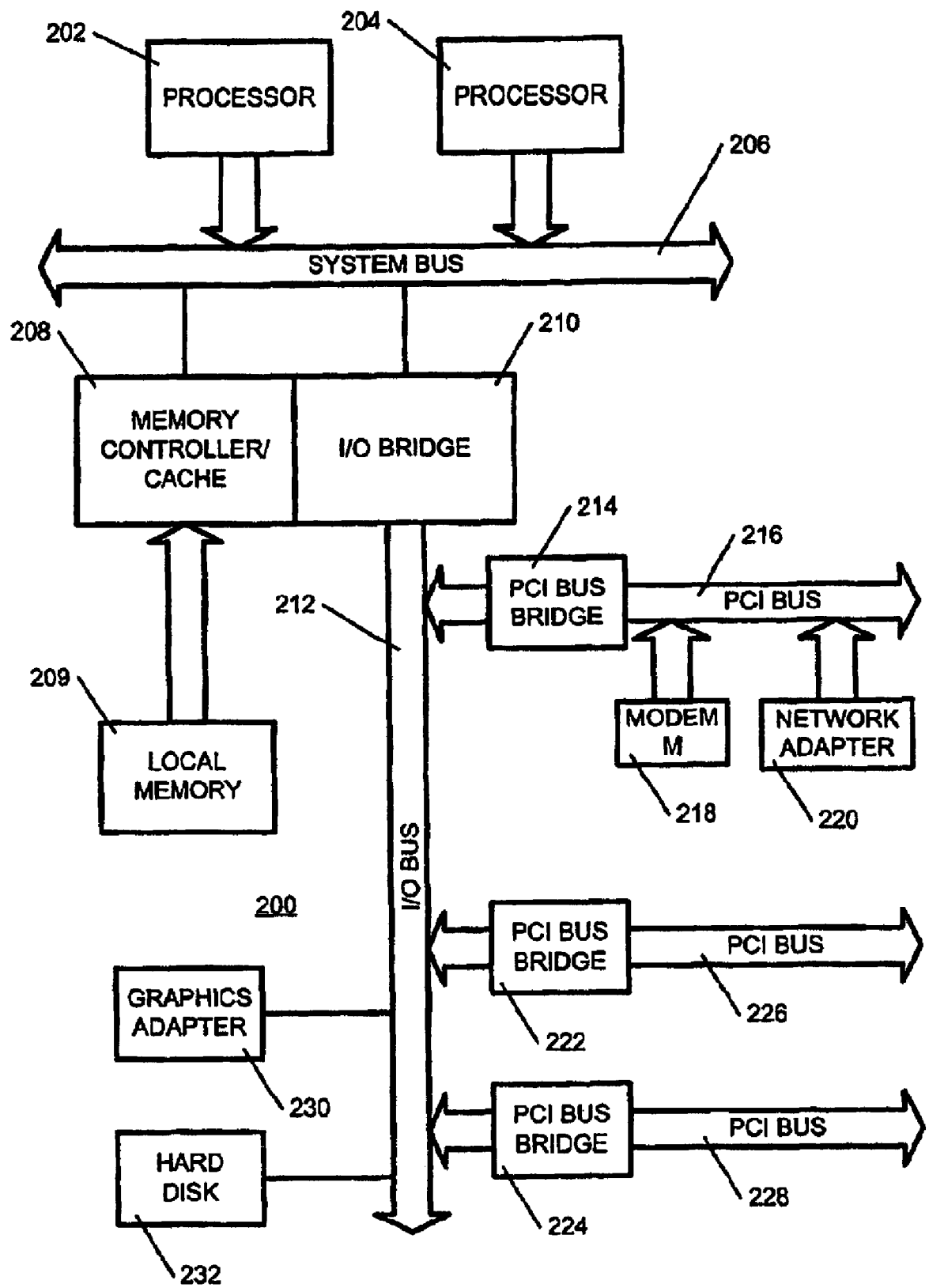
FIG. 2 shows an exemplary block diagram of a server apparatus according to the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is also connected to system bus 206 and provides an interface to I/O bus 212. Memory controller/cache 208 and I/O bus bridge 210 may be integrated together.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Figure 3:
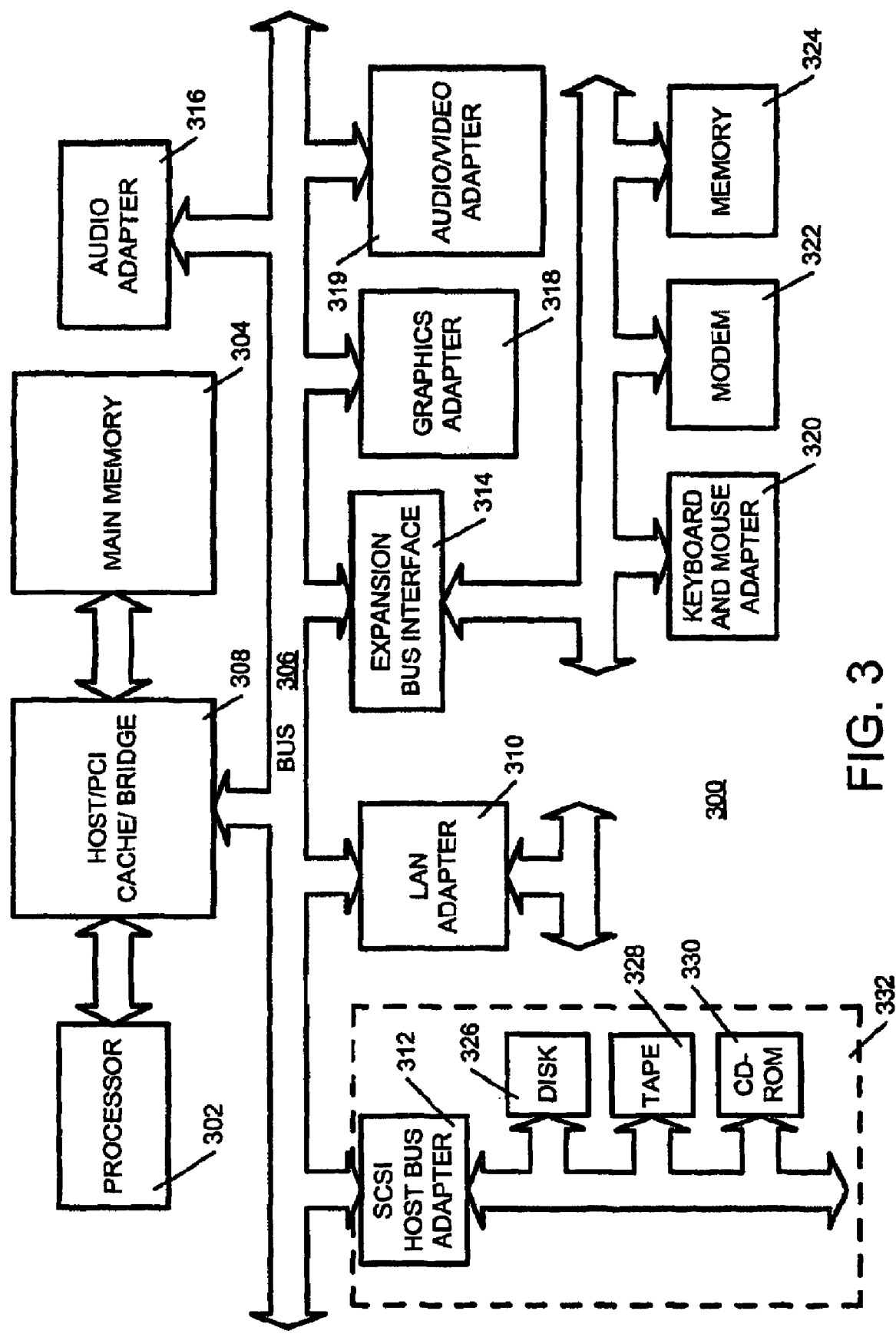
FIG. 3 shows an exemplary block diagram of a client apparatus according to the present invention.

With reference now to FIG. 3, a block diagram illustrating a data processing system in which the present invention may be implemented is depicted. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations can support three or four PCI expansion slots or add-in connectors.

An operating system runs on processor 302 and is used to coordinate and provide control of various components within data processing system 300 in FIG. 3. The operating system may be a commercially available operating system, such as Microsoft Windows® 2000. An object oriented programming system such as Java™ may run in conjunction with the operating system and provide calls to the operating system from Java programs or other applications executing on data processing system 300. Instructions for the operating system, the object-oriented operating system, and applications or programs can be located on storage devices, such as hard disk drive 326, and may be loaded into main memory 304 while being executed by processor 302.

As another example, data processing system 300 may be configured to be bootable without relying on the type of network communication interface. Also, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are merely for illustration. For example, data processing system 300 may also be a notebook computer or hand held computer taking the form of a PDA. Data processing system 300 also may be a kiosk or a Web appliance.

The present invention provides a method and an apparatus for setting a bookmark for a resource. The present invention is applicable in the client device 108, 110, 112 (i.e. personal computers or network computers) or server 104 as shown in FIG. 1. The present invention may also embodied in various data storage media (such as soft disc, optical disc, hard disc, ROM, RAM, and so on) used by a computer system.

Figure 4:
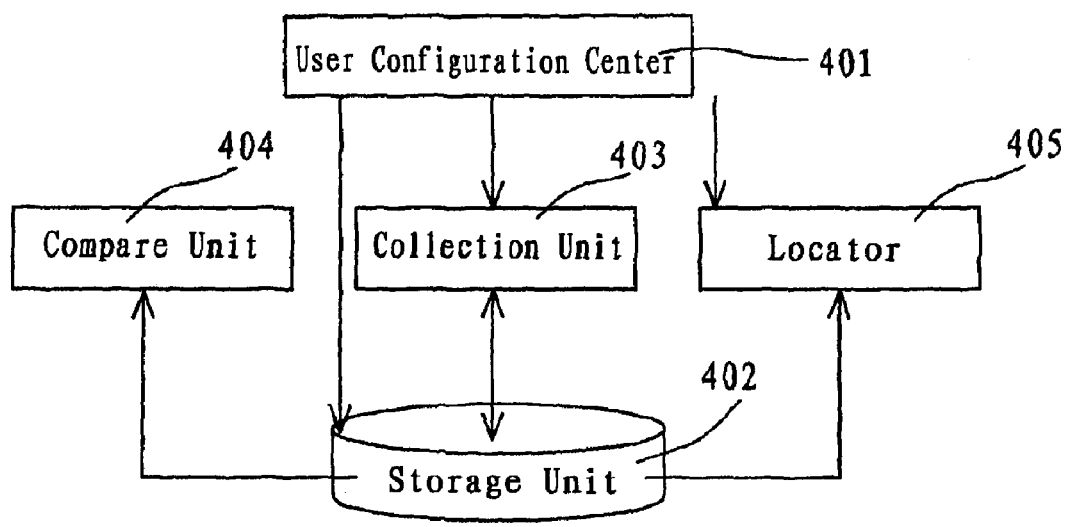
FIG. 4 shows a schematic view of the components for bookmarking resources according to an embodiment of the present invention.

The apparatus for setting a bookmark for a resource according to the present invention can be implemented by the data processing system 200 shown in FIG. 2 or the data processing system 300 shown in FIG. 3. Specifically, as shown in FIG. 4, the apparatus providing a specific section of a resource according to a previously set bookmark includes 5 units: User Configuration Center 401, Storage Unit 402, Collection Unit 403, Compare Unit 404 and Locator 405.

The User Configuration Center 401 is used to set the collection rate of the whole document and to select the re-display mode of the document according to the bookmark mode. For example, it may be set by the end-user via a mouse or a keyboard through various editing tools (e.g., Microsoft Office or Adobe Acrobat Reader tools) or graphical user interfaces of the browser. Thus the end-user is able to define the accuracy in comparing the documents by setting the collection rate of the whole document.

The collection rate set by the end-user can be stored in the Storage Unit 402. The Storage Unit 402 may be the main memory 304 as shown in FIG. 3.

The Collection Unit 403, the Compare Unit 404 and the Locator 405 may be, for example, functional modules in the processors 202, 204 or the processor 302 shown in FIGS. 2 and 3.

The Collection Unit 403 is connected to the User Configuration Center 401 and the Storage Unit 402. It collects the points according to the setting provided by User Configuration Center 401, gets the context of current screen, and then transmits the points and screen context information to Storage Unit 402.

The Compare Unit 404 is used to judge whether the bookmarked document representation is still effective. Specifically, the Compare Unit 404 retrieves bookmarked points in the document from Storage Unit 402 and judges whether the bookmark is effective by comparing the same with the contents extracted from the actual document.

The Locator 405 selects the specific section of the downloaded resource according to the compared result of the Compare Unit 404 and displays the selected specific section of the resource.

Figure 5:
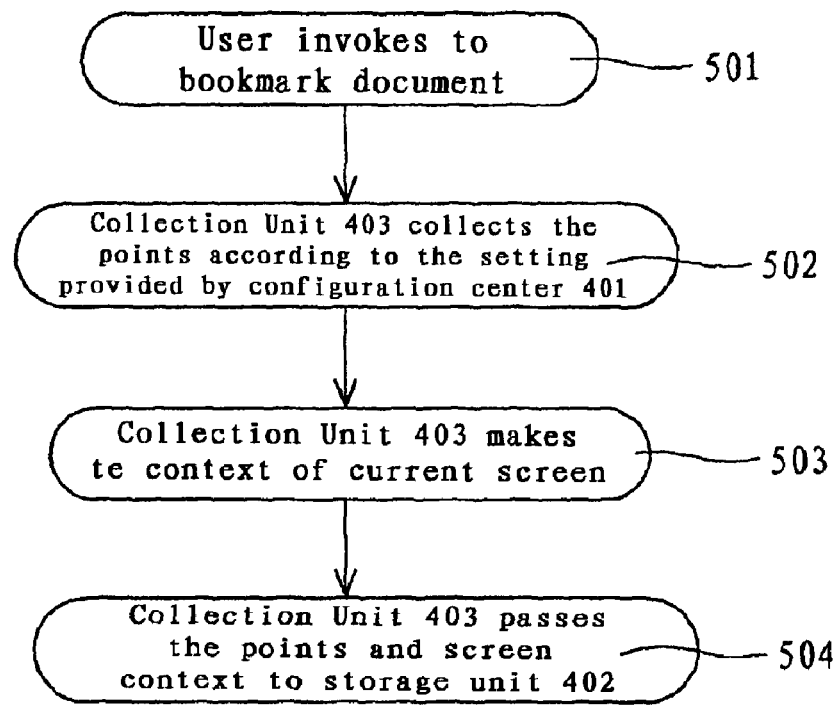
FIG. 5 shows a flowchart of the method of generating a bookmark according to an embodiment of the present invention.

FIG. 5 shows a flowchart of the method of generating bookmark according to an embodiment of the present invention. This method can be realized by the apparatus for setting a bookmark for a resource as shown in FIG. 4.

In step 501, a user's request for bookmarking a resource is received. The user may input an expected collection rate for collection while requesting that the resource be bookmarked. The collection rate provided by the user through the User Configuration Center 401 may be stored in the Storage Unit 402 or directly sent to the Collection Unit 403 for collection in order to customize different collection rates for different documents.

In step 502, in response to the bookmarking request, the Collection Unit 403 begins to collect the whole document information. Here, Internet or Intranet web pages are taken as examples of resource objects; resource objects also may be other types of documents over the network or in the same computer, including Microsoft Office documents such as Word, Excel, PowerPoint, Access and Adobe Acrobat documents. The Collection Unit 403 may extract the real text from a web page without extracting HTML tags, pictures and multimedia data.

The Collection Unit 403 gets the collection rate from the Storage Unit 402 or the User Configuration Center 401 and collects the respective points according to the collection rate to form an abstract of the document. Alternatively, the present invention can make an abstract using the abstract maker tool inside the text editor. In this case, Collection Unit 403 analyzes the document and designates a rank for each sentence to determine the outline in the document. Those text contents (e.g. sentences) containing words which are often used in the document are designated the highest rank. Then the user selects some sentences with the highest rank according to a percentage. The selected sentence is displayed in the abstract. Here, the "percentage" used in the abstract maker has the same meaning as the collection rate, i.e., the percentage with respect to the original length.

The object of making an abstract is to identify, by fuzzy matching, whether a re-visited document is the same as the document that was booked. If so, the re-visited document is an effective document. Step 502 is optional, and the method of the present invention can get the screen context information by analyzing the resource object directly using the text locator element without making an abstract.

In step 503, the Collection Unit 403 describes the current screen context using the text locator element. Screen context records the information of the current screen, including at least one text locator element in the first word in the screen, some certain word, or the first paragraph and so on. In this example, the first word in the screen is used as a text locator element. The first word is recorded. For example, the first word may be "<complexType." Other words may be randomly picked up from the current screen context beginning with the first word at a pick-up rate that is the collection rate defined by the end-user in the User Configuration Center 401.

Screen context information could be different for different documents. For example, it could have "heading" information for an html document.

Line number, paragraph number and screen resolution may also be used as a part of screen context information to facilitate the above retrievable text locator element associated with the actual contents in order to describe the context of the current screen. Screen context information may include, in addition to plain text information, information about the way text is arranged and displayed. For example, if pictures in the screen might cover the whole screen, screen context information may include picture information, like its source.

In Step 504, the Collection Unit 403 sends the address information, the abstract information, and the screen context information of the bookmarked resource to the Storage Unit 402 for recording. The flow of bookmarking is terminated.

Figure 6:
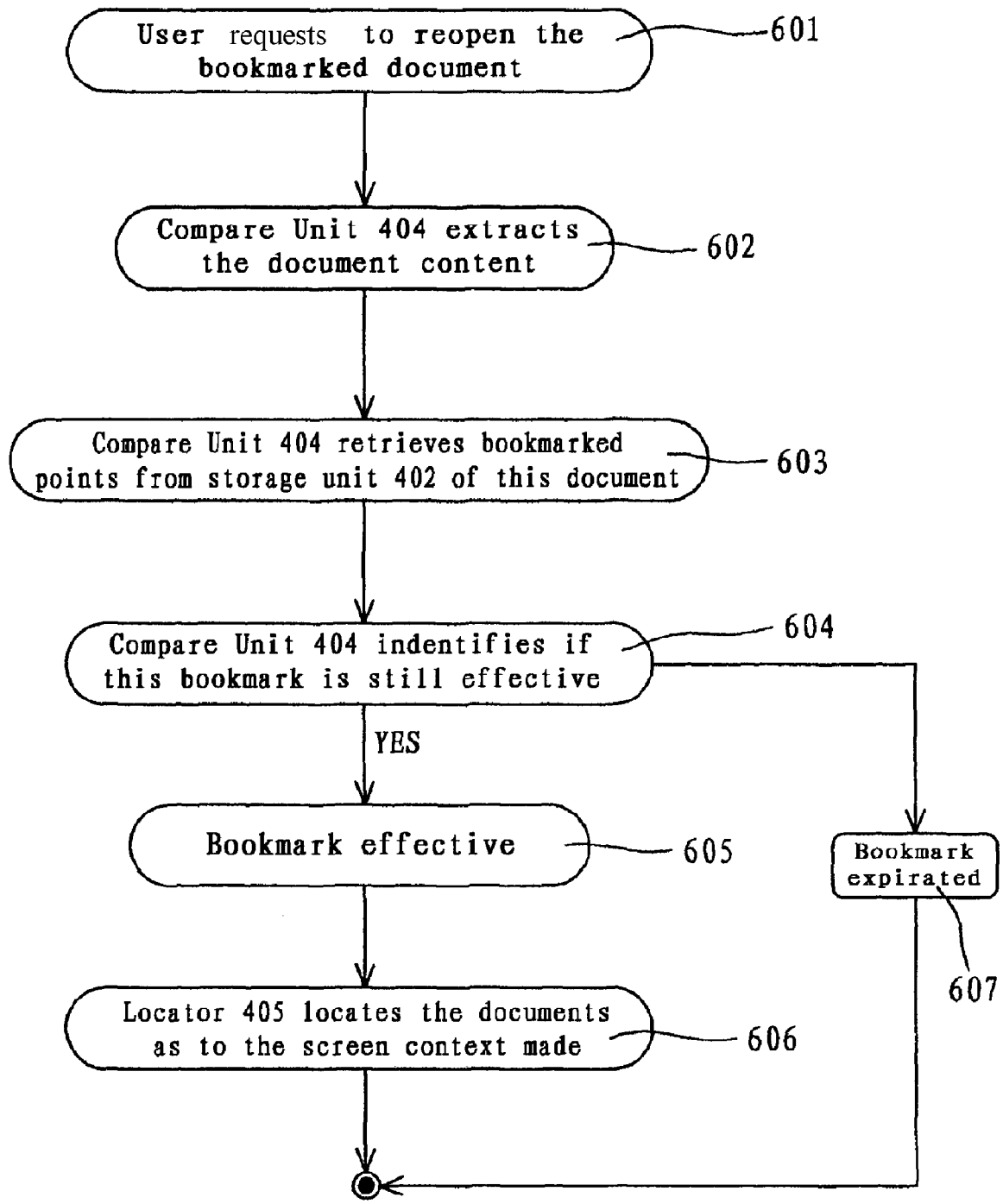
FIG. 6 shows a flowchart of the method of representing resources in response to the selection of a bookmark according to an embodiment of the present invention.

FIG. 6 shows a flowchart of the method of representing resources in response to the selection of a bookmark according to an embodiment of the present invention.

In Step 601, the user requests to reopen the bookmarked document. In Step 602, the Compare Unit 404 extracts the real text of the document according to the hyperlink address indicated in the bookmark. The hyperlink address included in the bookmark may be, for example, the path information of Unified Resource Identifier (URI). In this embodiment, URI for a web page may be a Unified Resource Locator (URL) address, which is used to specify the protocol (such as HTTP or FTP) and the positions of objects, documents, Web pages or other targets in the Internet or Intranet. It may be a UNC path (Universal Naming Conversion path) as well, which is used to locate the address of a document. If the other documents in the same client machine are the bookmarked objects, the path information included in the bookmark is UNC path information.

In Step 603, the Compare Unit 404 retrieves the abstract of the bookmarked document from the Storage Unit 402. Then, in Step 604, the Compare Unit 404 makes an abstract of the document according to the collection rate retrieved from the Storage Unit 402, and determines whether the document is an effective document by comparing the abstract of the actual document with the recorded one retrieved from the Storage Unit 402. As in Step 502 of FIG. 5, the Compare Unit 404 can make an abstract directly by using the abstract maker tool inside the text editor.

If the document is judged to be ineffective in step 605, the document is expired and the flow is terminated.

Steps 603, 604 and 605 are optional in the method of representing resources in response to the selection of a bookmark according to the present invention. They may be omitted if it is not necessary to judge whether the re-visited document is effective or if no abstract information is made while setting bookmark. The method of the present invention can omit steps 603, 604, and 605 and directly perform the process of Step 606.

In step 606, if the document is still effective, the Compare Unit 404 makes a simulated screen snapshot of the actual document by using the screen context information included in the obtained bookmark. For example, if the first word "<complexType" in the screen context information in the obtained bookmark is used as the retrievable text locator element associated with the actual contents, then the Compare Unit 404 searches "<complexType" in the actual document. Once the word "<complexType" is found, a simulated screen snapshot is formed starting from the word "<complexType". Then the Compare Unit 404 picks-up words from the simulated screen snapshot in the same way that the Collection Unit 403 does. That is, the Compare Unit 404 picks-up words in the simulated screen snapshot with the same retrievable text locator element associated with the actual contents, such as the first word, some certain word or the first paragraph, and at the same collection rate. The Compare Unit 404 compares these picked words with the respective words collected by the Collection Unit 403 and stored in the Storage Unit 402 as screen context information. If they match, the screen in the display window using the locator is displayed and the bookmark locating is done. The term "match" as used herein depends on the specific fuzzy matching algorithm and does not have to be 100% the same. If they don't match, Step 606 is repeated to remake a simulate screen snapshot to perform matching until the end of the document is reached.

If the screen context information of the bookmark further includes line number, paragraph number, screen resolution and/or the way the text is arranged and displayed, the Compare Unit 403 matches the simulated screen snapshot and the stored screen context information in combination with such auxiliary information.

If there are pictures in the screen, the Compared Unit may decide the size and shape of the picture according to the picture information in the screen context information without downloading the picture while downloading the actual document or while forming the simulated screen snapshot. If the finally selected simulated screen snapshot includes pictures, the contents can be downloaded continuously. The user can be allowed or not allowed to scroll up and down to see the remaining sections of the page according to specific requirements, or the pictures outside the selected screen can be displayed on the screen after continuous downloading when the user scrolls up and down to see the remaining sections of the page.

Although the present invention is specifically described in combination with the embodiments, the present invention is not limited by such embodiments. Various changes can be made without departing from the present invention. For example, in embodiments of the present invention, the screen context information is described as the first word in the display window. That is, the text contents are collected to get the screen context information by starting from the first word in the current screen. Other information, such as the second word, the last word or the first paragraph can also be used as the text locator element. In the scope of the disclosure of the present invention, those skilled in the art can conceive other technical solutions for reflecting the contents and the structure of the document on the display screen.

What is claimed is:

1. A method of bookmarking a section of a resource in a data processing system, the method comprising:
   receiving a request to bookmark a section of the resource that is displayed in a current screen;
   collecting screen context information from the current screen of the resource, wherein the screen context information is for selecting the current screen in response to a user selecting a bookmark for the current screen;
   making an abstract for determining, in response to the user selecting the bookmark, whether the resource is effective;
   storing, on a computer readable medium, address information, and the screen context information of said resource as a bookmark, and the abstract associated with the bookmark;
   wherein said bookmark can be used to return to said section of the resource.

2. The method of claim 1, wherein the screen context information is collected at a predetermined collection rate.

3. The method of claim 2, further comprising receiving from a user input with the predetermined collection rate.

4. The method of claim 2, further comprising obtaining the predetermined collection rate from a storage unit.

5. The method of claim 1, wherein said screen context information comprises a text locator element.

6. The method of claim 5, wherein said text locator element is a first word, a certain word or a first paragraph in the current screen.

7. The method of claim 5, wherein said screen context information further comprises text locating auxiliary information.

8. The method of claim 7, wherein said text locating auxiliary information comprises a line number, a paragraph number, a screen resolution or information about the way text is arranged and displayed.

9. The method of claim 1, wherein making the abstract further comprises making an abstract for the real text in the current screen of the resource at a predetermined collection rate.

10. A method of providing a section of a resource using a bookmark, said method comprising:
    downloading resource content to a computer readable medium in response to a user's request to reopen the resource, the resource content identified by address information stored with the bookmark;
    collecting screen context information from the downloaded resource content;
    determining whether the resource is an effective document using an abstract associated with the bookmark;
    comparing the screen context information from the downloaded resource content with the screen context information indicated by the bookmark;
    selecting the section of the resource according to a rule of fuzzy matching; and
    displaying the section of the resource in a display window in response to finding a match to the screen context information and determining that the resource is an effective document.

11. The method of claim 10, wherein the screen context information indicated by the bookmark is obtained by collecting the section of the resource at a predetermined collection rate; and wherein collecting screen context information for the downloaded resource content further comprises collecting screen context information for the downloaded resource content at the predetermined collection rate.

12. The method of claim 11, wherein the screen context information indicated by the bookmark comprises a text locator element, the step of collecting screen context information for the downloaded resource content at the predetermined collection rate further comprising:
    retrieving the section in the resource that matches with said text locator element;
    collecting real text for the downloaded resource content at the predetermined collection rate based on the section that matches with the text locator element to obtain respective simulated screen snapshots; and
    comparing said respective simulated screen snapshots with the screen context information indicated by the bookmark.

13. The method of claim 12, wherein said text locator element is a first word, a certain word or a first paragraph in the current screen.

14. The method of claim 12, wherein said screen context information further comprises text locating auxiliary information.

15. The method of claim 14, wherein said text locating auxiliary information comprises a line number, a paragraph number, a screen resolution or information about the way text is arranged and displayed.

16. The method of claim 10, wherein said bookmark further comprises the abstract made for the real text of the resource, and wherein determining whether the resource is an effective document further comprises:
    making an abstract for the downloaded resource content;
    comparing the abstract for the downloaded resource content with the abstract indicated by said bookmark; and
    using said comparison to judge whether the downloaded resource content is effective.

17. A bookmarking apparatus for bookmarking a section of a resource in a data processing system, comprising:
    a collection unit for collecting screen context information from a current screen of a resource in response to a request to bookmark the current screen of the resource, wherein the screen context information is for selecting the current screen in response to the user selecting a bookmark for the current screen;
    an abstract maker configured to make an abstract for determining, in response to a user selecting the bookmark, whether the resource is effective;
    a storage unit for storing address information and the screen context information of said resource as a bookmark to be used to return to said section of the resource, and for storing the abstract associated with the bookmark.

18. The bookmarking apparatus according to claim 17, wherein the abstract maker makes the abstract for the real text of the resource.

19. The bookmarking apparatus according to claim 17, wherein the abstract maker is configured to make the abstract for the current screen at a predetermined collection rate.

20. An apparatus comprising computer readable media for providing a specific section of a resource based on a preset bookmark, the bookmark comprising address information, screen context information obtained by collecting the specific section of the resource, and abstract information made for real text of the resource, said apparatus comprising:
    a compare unit for downloading the resource content identified by the address information to a memory in response to a user's request to reopen the resource, collecting screen context information for the downloaded resource content, and comparing the screen context information of the downloaded resource content with the screen context information indicated by said bookmark, wherein said compare unit is configured to make abstract information for the downloaded resource content, to compare the abstract information for the downloaded resource with the abstract information indicated by said bookmark, and to judge whether the downloaded resource content is effective; and
    a locator for selecting the specific section of the resource according to a rule of fuzzy matching and displaying the selected specific section of the resource in a display window.

* * * * *